US007224808B2

(12) United States Patent
Spencer et al.

(10) Patent No.: US 7,224,808 B2
(45) Date of Patent: May 29, 2007

(54) DYNAMIC CARRIER SYSTEM FOR PARAMETRIC ARRAYS

(75) Inventors: Michael E. Spencer, Redondo Beach, CA (US); James J. Croft, III, Poway, CA (US)

(73) Assignee: American Technology Corporation, San Diego, CA (US)

(*) Notice: Subject to any disclaimer, the term of this patent is extended or adjusted under 35 U.S.C. 154(b) by 965 days.

(21) Appl. No.: 10/234,958

(22) Filed: Sep. 3, 2002

(65) Prior Publication Data

US 2003/0091196 A1 May 15, 2003

Related U.S. Application Data

(63) Continuation-in-part of application No. 10/232,755, filed on Aug. 30, 2002, now abandoned.

(60) Provisional application No. 60/316,720, filed on Aug. 31, 2001.

(51) Int. Cl.
*H04B 3/00* (2006.01)
*H04B 1/02* (2006.01)

(52) U.S. Cl. ......................... 381/77; 381/106; 367/137

(58) Field of Classification Search .................. 381/77, 381/75, 79, 102, 106, 111; 455/72; 333/14; 367/137, 138
See application file for complete search history.

(56) References Cited

U.S. PATENT DOCUMENTS 4,166,197 A 8/1979 Moog et al.
4,703,462 A * 10/1987 Woodsum .................... 367/92
4,823,908 A 4/1989 Tanaka et al.
5,859,915 A 1/1999 Norris
6,108,427 A 8/2000 Norris et al.
6,359,990 B1 3/2002 Norris
6,850,623 B1 * 2/2005 Norris et al. ................. 381/97

(Continued)

FOREIGN PATENT DOCUMENTS

EP 973152 A2 7/1999

(Continued)

OTHER PUBLICATIONS

Parametric Loudspeaker—Characteristics of Acoustic Field & Suitable Modulation of Carrier Ultrasound, Kenichi Aoki, et al., Electronics & Comm. in Japan, Part 3, vol. 74, No. 9, 1991, 76-82.

(Continued)

*Primary Examiner*—Xu Mei
(74) *Attorney, Agent, or Firm*—Thorpe North & Western LLP

(57) ABSTRACT

A system configured to dynamically adjust the ultrasonic carrier level in a parametric array system in response to changing source signal input levels, and which employs a look-ahead delay strategy to enable optimal modulation of the carrier wave to eliminate constant ultrasonic carrier emission and reduce the ultrasonic carrier emission to what is actually needed to accommodate the db range of the source material, and at the same time, to also minimize noticeable distortion and sound artifacts of a high-power ultrasonic carrier, and/or distortion/artifacts arising from modulation of an ultrasonic carrier to reduce average power output; and thus it realizes advantages of carrier modulation based on source-signal level, while minimizing inherent drawbacks of carrier modulation.

26 Claims, 3 Drawing Sheets

U.S. PATENT DOCUMENTS

2005/0207587 A1 * 9/2005 Pompei ........................ 381/77

FOREIGN PATENT DOCUMENTS

| | | |
|---|---|---|
| WO | 03931 | 5/2000 |
| WO | 01/52437 A1 | 1/2001 |

OTHER PUBLICATIONS

Possible Exploitation of Non-Linear Acoustics in Underwater Transmitting Applications, H.O. Berktay, J. Sound Vib. (1965) 2 (4), 435-461.

Suitable Modulation of the Carrier Ultrasound for a Parametric Loudspeaker, T. Kamakura, et al., Acustic vol. 73 1991, 215-217.

Audio Spotlight:An Application of Nonlinear Interaction of Sound Waves to a New Type of Loudspeaker Design, Masahide Yoneyama, et al., J. Acoust. Soc. Am. 73 (5), May 1983, pp. 1532-1536.

Developments of Parametric Loudspeaker for Practical Use (paper presented), Kamakura Tomoo, et al., 10th ISNA, 1984, 147-150.

A Study for the Realization of a Parametric Loudspeaker, Tomoo Kamakura, et al. (paper presented) 1985, 1-18.

* cited by examiner

DYNAMIC CARRIER SYSTEM FOR PARAMETRIC ARRAYS

This application is a continuation-in-part of U.S. Non-provisional Patent Application Ser. No. 10/232,755, filed Aug. 30, 2002 now abandoned, and also claims priority of U.S. Provisional Patent Application No. 60/316,720 filed Aug. 31, 2001.

BACKGROUND OF THE INVENTION

1. Field of the Invention

The invention relates generally to systems, devices and methods for sound reproduction. More specifically, the invention relates to a parametric sound reproduction system wherein economies are realized by dynamically adjusting the ultrasonic carrier level in a parametric array in response to changing input levels of the source audio signal being reproduced in the array.

2. Related Art

It has been recognized that there are advantages in modulating the output power level, or "envelope" (amplitude modulated or single sideband modulated) of an ultrasonic carrier wave in a parametric loudspeaker system application. This has been known since at least as early as 1991, when the work of Kamakura, Aoki, and Kumamoto was published, as noted below. Modulation of the carrier can provide a more efficient system than using a carrier of fixed amplitude, as such a fixed carrier must be of sufficient amplitude level to accommodate peak levels in the audio source material signal without distortion. In contrast to a fixed carrier, using a modulated carrier the envelope can expand and contract with the source signal level; and it is possible to produce a carrier amplitude of essentially zero when the source signal level is essentially zero, for example. Average radiated power is markedly reduced because of the greater efficiencies inherent in only providing so much carrier amplitude as is needed to accommodate the source signal level. Accordingly, less amplifier power is required, and less emitter heating is caused, both enabling lower costs in the system. Attempts have been made to accomplish this variation of radiated power of the carrier in a variety ways.

Examples of such prior work, and further background information regarding parametric array systems and carrier modulation can be found in the following references: published European Patent Application No. EP 0973152 A2 filed Jul. 15, 1999 by Massachusetts Institute of Technology, naming Frank J. Pompei as inventor; published European Patent Application No. EP 0003931 A1 filed May 5, 2000 by Sennheiser Electric GMBH & CO.KG, naming Wolfgang Niehoff et al. as inventors; and, the article referenced above, "Suitable Modulation of the Carrier Ultrasound for Parametric Loudspeaker" by T. Kamakura, K. Aoki, and Y. Kumamoto, ACUSTICA Vol. 73 (1991), each of these references are incorporated in this disclosure by reference for the relevant teachings consistent with this disclosure.

SUMMARY OF THE INVENTION

As discussed, it has been recognized that it would be advantageous to develop a system that dynamically adjusts the ultrasonic carrier level in a parametric array system in response to changing input levels. It is also realized that such modulation of the carrier can introduce distortions and other audible sound artifacts, which can be undesirable. The present invention enables dynamic reduction of the carrier level to essentially only that required for a given source material, without adversely affecting the audio dynamics experienced by a listener, and without causing distortion or other undesirable audible artifacts which can be noticeable to a typical listener.

The system provides a method for improving performance of a parametric speaker system, comprising the steps of:

a) delaying an audio signal prior to parametrically reproducing the audio signal;

b) monitoring a level of the audio signal during the delay; and c) modulating a carrier envelope based on the monitored level of the audio signal to provide sufficient power to produce a desired audio output and reduce carrier energy when it is not required to reproduce the signal, combining the delayed audio signal with the modulated carrier to parametrically reproduce the audio signal, thereby improving power use efficiency.

In a more detailed aspect, the method can further comprise: the step of pre-processing the audio signal to minimize distortion of the parametrically reproduced audio signal; and the further steps of reducing sound artifacts induced by carrier modulation so as to be substantially unnoticeable to a listener by;

i) limiting a growth rate of the carrier envelope based on a first target value of the audio signal; and ii) limiting a rate of decay of the carrier envelope based on a second target value of the audio signal.

In a further more detailed aspect, the system can comprise the further steps of:

a) providing a delay of about one millisecond; and b) limiting the growth rate of the carrier envelope to about 70% of the first target value over the time period of the delay. In a further more detailed aspect the first target value can be a peak amplitude value of the audio signal and the second target value is a minimum amplitude value of the audio signal. The delay can be up to 3 milliseconds.

In a further more detailed aspect, the system can be configured for limiting the growth rate and rate of decay of the carrier envelope by limiting a change in slope of the carrier envelope as a function of time. Further the system can be configured for analyzing the delayed audio signal and modifying the carrier envelope to comprise a smoothed envelope which encompasses the audio signal. The further step of modulating the smoothed carrier signal envelope so that the rate of increase and the rate of decay of the carrier envelope are both controlled to be within a preset limit can be taken; and the further step of imposing the audio signal on the smoothed modulated carrier envelope to produce a sideband signal, thereby minimizing distortion of the sideband signal due to carrier envelope modulation can be provided for.

In further detail, the system can be configured for predistorting the audio signal to substantially compensate for undesirable distortion introduced by modulation of the ultrasonic envelope. The system can be configured for predistorting the carrier envelope to compensate for distortion induced by modulation of the carrier envelope.

In another more detailed aspect, the system can be configured for sampling the level of the audio signal during the time delay and calculating an optimal modification to the modulation of the carrier envelope based on the audio signal to reduce undesirable audio artifacts of carrier envelope modulation.

In another aspect of the invention the system can be configured to perform a method for improving performance of a parametric speaker system, comprising the steps of:

a) delaying an audio signal prior to parametrically reproducing the audio signal;

b) monitoring a level of the audio signal during the delay; and c) modulating a carrier envelope to be associated with the audio signal so as to limit growth and decay ahead of and behind rapid changes in the audio signal level to smooth the carrier envelope to reduce audio artifacts resulting from corner modulations, whereby power use efficiency of parametric reproduction is increased and noticeable distortion of the audio signal is reduced.

In another aspect of the invention, it can provide a system for optimizing carrier signal strength for dynamic audio signal reproduction in a parametric audio reproduction system, comprising:

a) a time delay processor for delaying an audio signal to enable sensing and processing of the audio signal prior to parametrically reproducing the audio signal;

b) a signal envelope sensor configured to sense an envelope corresponding to a parameter of the audio signal; and c) a carrier wave generator configured to generate a modulated carrier wave based on the envelope sensed by the signal envelope sensor;

d) wherein the audio signal is delayed, the signal envelope is sensed, and the carrier wave is generated and modulated to improve power use efficiency in parametric reproduction of the audio signal.

In further detail, a pre-processor configured to pre-process the audio signal to create minimal detectable distortion of the audio signal can be provided. The system can be configured so that the carrier wave generator modulates the carrier wave by increasing or decreasing a growth or decay rate of the carrier wave based on a target value of the audio signal. The system can include a pre-processor configured to pre-process the audio signal to create minimal detectable distortion of the audio signal.

In a further more detailed aspect, the time delay processor delays the audio signal by up to 1, 2, or 3 milliseconds, or much longer in applications with wideband low frequency response.

In more detail, the carrier wave generator can be configured so that it modulates the carrier wave such that a rate of increase and a rate of decay of the carrier wave are both controlled to be within a preset limit. The system can include an audio signal processor which pre-distorts the audio signal to substantially compensate for undesirable distortion induced by modulation of the carrier wave. The system can further include a carrier wave processor which pre-distorts the carrier wave to substantially compensate for undesirable distortion induced by modulation of the carrier wave.

In another more detailed aspect, the system can include a dynamic range compressor and/or a dynamic range expander. A dedicated circuit or algorithm can be included which processes the audio source material based on a sensed dynamic level of the source material. A dynamic range compressor can provide an improved listening experience, particularly in a noisy listening environment, and also more particularly when the source material has a wide dynamic range.

Additional features and advantages of the invention will be apparent from the detailed description of exemplary embodiment(s) which follows, taken in conjunction with the accompanying drawings, which together illustrate, by way of example, features of the invention.

DETAILED DESCRIPTION OF PREFERRED EMBODIMENT(S)

Figure 1:
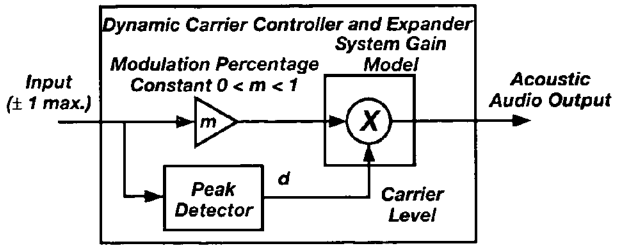
FIG. 1 is a schematic diagram illustrating principles of the invention in a basic carrier level controller and gain model.

For the purposes of promoting an understanding of the principles of the invention, reference will now be made to the exemplary embodiment(s) illustrated in the drawings, and set forth in this following detailed description, and specific language will be used to describe the same. It will nevertheless be understood that no limitation of the scope of the invention is thereby intended. Alterations and further modifications of the inventive features illustrated herein, and any additional applications of the principles of the invention as illustrated herein, which would occur to one skilled in the relevant art and having possession of this disclosure are considered within the scope of the invention, which is defined by allowable claims, and is not limited by this exemplary treatment and exposition of the subject matter.

As discussed above, the invention enables a parametric audio reproduction array system that minimizes the carrier level for a given source material without adversely affecting the audio signal dynamics perceived by a listener, and without causing other undesirable audible artifacts. This can result in efficiencies such as reduced average ultrasonic radiated energy and lowered average power consumption. Further, lowering the average radiated energy per unit time will result in reduced emitter heating. This reduction in heating can increase the service life of the emitter(s). Moreover, since emitter components of the system do not have to withstand as high an average temperature they need not be as robust. Cost savings can result from using lower-cost materials and/or lower-cost manufacturing techniques.

Another benefit is that high-pitched phantom tones which can result from an intense constant ultrasonic carrier are reduced, and/or, are more effectively masked by the audio content. It is recognized that for the same average radiated power, an intense (i.e. loud) audible tone of variable pitch and intensity is less objectionable than an intense tone of constant pitch and intensity. While it is uncertain whether this necessarily holds true in the ultrasonic portion of the audio-frequency spectrum in every case, it is likely that overall a variable carrier will be superior to a constant amplitude carrier from a listener's perspective.

Exemplary system(s) configured for controlling the modulation of the carrier by limiting its rise and decay rates will first be described. Nevertheless, it will be understood from the forgoing discussion that another implementation of the invention is to modify the source program material signal to pre-distort it to compensate for distortions introduced by modulation of the carrier, or to likewise "pre-distort" the carrier to make the same correction (essentially correcting for undesirable effects of modulation by further tweaking of the modulation, that is to say, likewise in a sense to pre-distort it, to compensate for the distortions caused by the rapid change in frequency of the carrier). The latter implementation(s) allow(s) the carrier level to substantially match the level of the source signal, which is most efficient from a power consumption standpoint. In another embodiment a correction can be applied to both the source signal and the carrier to eliminate audible artifacts of carrier modulation.

In each case it will be apparent that the corrective measures are enabled by the delay of the source signal in accordance with the invention. This is true whether the delay is either to facilitate limitation of rise and decay rates, or to facilitate calculation of appropriate corrections to be imposed on the source signal and/or the carrier.

In other exemplary embodiment(s) which will follow concerning controlling the modulation of the carrier to limit rise and decay rates to minimize distortions and artifacts from said carrier modulation, at least to the point that they are not generally noticeable to a typical listener, are advantageous in that they are generally simpler to implement than pre-distortions of the source signal or carrier to compensate for the carrier modulation distortions. Nevertheless, the embodiment(s) controlling carrier modulation substantially accomplish the goals of average power requirement reduction and distortion minimization. Generally a one to two-millisecond delay is used. However with some source material, and in some applications, a longer delay can be used. For example in certain applications where wideband low frequency response is a characteristic, then much longer delays can be desirable.

Further description and analysis below will proceed by first revisiting Berktay's far-field solution for the air column demodulated audio signal. Then, a basic carrier level control scheme is presented and analyzed. A family of parametric control laws is derived and explained, the implementation of which laws allow setting the modulator characteristic from a constant carrier level (no carrier control) to a constant percentage modulation (full dynamic carrier control) using a single parameter. Next, a signal detector design and its dynamic response are addressed. Finally, a practical dynamic carrier control system is developed that uses the Hilbert transform filter in the existing single-sideband modulator as the envelope detector. Lastly, compensating for distortion by introducing compensating distortion will be discussed.

The audio output of the parametric speaker system is proportional to the carrier level. Distortion products have been derived for the discrete tone case with single sideband modulation. The relationship between electrical and acoustical modulation indices has also been developed.

We now review the derivation of the frequencies and amplitudes of the distortion products for the discrete tone case. Recall that Berktay's equation (repeated below) states that the amplitude of the secondary (demodulated) beam is proportional to the second derivative of the square of the modulator envelope:

$$\text{demodulated audio} = p(t) = k\frac{\partial^2}{\partial t^2}[env(t)^2] \tag{A1}$$

where env(t) is at the time varying envelope of the ultrasonic carrier wave and k is assumed a constant for our purposes. (k is actually proportional to the primary beam pressure amplitude, squared, times the cross-sectional area of the beam divided by the distance to the transducer (among other parameters). The reader is referred to Berktay's paper for details: *"Possible Exploitation of Non-linear Acoustics in Underwater Transmitting Applications"*, Sound Vibration, 1965, at pp.435–461.

The second-derivative factor produces a slope in the frequency response of +12 dB/octave, boosting high frequencies. The squaring adds significant distortion if the envelope is generated with an AM modulator. As is known, single sideband modulation generates no distortion when modulating a single tone. However, distortion will result when performing SSB modulation with two or more tones. It is assumed for now that SSB modulation is used with one, two, or three or more discrete sinusoidal tones.

One Tone Case

Consider a parametric array system with an SSB modulator and a single sinusoidal input tone. Let ω

$\omega_0$=carrier frequency (in radians per second, $\omega_0=2\pi f_0$)

$\omega_1$=desired audio frequency c=carrier amplitude level a=side-tone amplitude level The electrical output of an upper-sideband modulator for a single tone input is given by $$\text{SSB modulator output} = v1i = c\cos(\omega_0 t) + a\cos((\omega_0+\omega_1)t). \tag{A2}$$

Since we wish to calculate the envelope, it is convenient to define the 90-degree phase-shifted counterpart to (A2):

$$v1q = c\sin(\omega_0 t) + a\sin((\omega_0+\omega_1)t) \tag{A3}$$

The variables v1i and v1q denote the single-tone, in-phase and single tone, quadrature, respectively, components of the SSB modulator output. Recall that the envelope squared of a bandpass signal is the sum of the in-phase component squared, plus the quadrature component squared. Therefore, we can write the squared-envelope for the single-tone case as follows:

$$\begin{aligned} env_1(t)^2 &= v1i^2 + v1q^2 \\ &= c^2\cos^2(\omega_0 t) + a^2\cos^2((\omega_0+\omega_1)t) + \\ &\quad 2ac\cos(\omega_0 t)\cos((\omega_0+\omega_1)t) + \\ &\quad c^2\sin^2(\omega_0 t) + a^2\sin^2((\omega_0+\omega_1)t) + \\ &\quad 2ac\sin(\omega_0 t)\sin((\omega_0+\omega_1)t) \\ &= c^2 + a^2 + 2ac[\cos(\omega_0 t)\cos((\omega_0+\omega_1)t) + \\ &\quad \sin(\omega_0 t)\sin((\omega_0+\omega_1)t)] \\ &= c^2 + a^2 + 2ac\cos(\omega_1 t) \end{aligned} \tag{A4}$$

Using trigonometric identities we have shown that the squared-envelope is not a function of the carrier frequency, $\omega_0$. It is only a function of the difference frequency, $\omega_1$.

Let's assume, for now, that a transducer is used that faithfully reproduces an ultrasonic signal in the air column. That is, the transducer frequency response is flat and it perfectly generates the signal, (A2), in the air column. Then, we can write the demodulated output audio using Berktay's equation (assuming k=1), with the expression for the envelope squared, (A4):

$$audio_1 = \frac{\partial^2}{\partial t^2}[env_1(t)^2] \tag{A5}$$

and after the final derivative, we have the audio output:

$$\text{audio}_1-2ac\omega_1^2\cos(\omega_1 t). \tag{A6}$$

Observations—

1. The audio signal is independent of the carrier frequency, $\omega_0$.
2. The single-tone case for SSB modulation has no distortion (no additional tones present).
3. The audio signal's amplitude is proportional to the carrier level, c.
4. The audio signal's amplitude is proportional to the side-tone level, a.
5. The audio signal's amplitude is also proportional to the square of the desired audio frequency, $\omega_1$, giving a +12 dB per octave high frequency boost.

Equation (A6) holds under the condition that the transfer function from the SSB modulator output to the ultrasonic transducer output (input into the air column) is unity. In reality, the power amplifier, matching network, and ultrasonic transducer will all have a frequency dependent transfer function. This overall transfer function is denoted by $$H(\omega)=H_{equalizer}(\omega)H_{amplifier}(\omega)H_{matching\ network}(\omega)H_{transducer}(\omega) \tag{A7}$$

where the equalizer portion could be used to control the overall parametric array response. That equalizer would typically reside on a DSP.

It is simple to account for the transfer function by observing how it affects the amplitude and phase of the two modulator output tones in equation (A2). The actual ultrasonic output from the transducer is given by $$\text{true ultrasonic output}=c'\cos(\omega_0 t+\theta_0)+a'\cos((\omega_{0+\omega 1})t+\theta_{01}) \tag{A8}$$

where the acoustic amplitudes are $$c'=c|H(\omega_0)|, \tag{A9}$$

$$a'a|H(\omega_0+\omega_1)| \tag{A10}$$

and the acoustic phases (ignoring propagation delays) are $$\theta=\angle H\omega_0), \tag{A11}$$

$$\theta_{01}=\angle H\omega_0+\omega_1), \tag{A12}$$

The demodulated audio output that results from the real-world transducer case, (A8) is $$\text{audio}_1'=-2ac|H(\omega_0)||H(\omega_0+\omega_1)|\omega_1^2\cos(\omega_1 t+\theta_{01}-\theta_0) \tag{A13}$$

Notice from (A13), that H(ω) may be designed to eliminate the undesirable +12 dB per octave high-boost that results from the $\omega_1^2$ term. Note, for a constant carrier frequency, $|H(\omega_0)|$ is constant and may be ignored. The $|H(\omega_0+\omega_1)|$ term could be constrained to be proportional to $1/\omega_1^2$(above a specified minimum frequency) by designing the appropriate equalizer filter, $H_{equalizer}(\omega)$ in (A6). Using this design procedure would result in an audio output level that is constant over the desired operating frequency.

Two Tone Case

Next, consider a parametric array system with an SSB modulator and two input tones. Let $\omega_0$=carrier frequency (in radians per second $\omega_0=2\pi f_0$)
$\omega_1$=first desired audio frequency
$\omega_2$=second desired audio frequency
c=carrier amplitude level
$a_1$=first side-tone amplitude level
$a_2$=second side-tone amplitude level The electrical output of an upper sideband modulator for a two-tone input is given by $$\text{SSB modulator output}=v2i=c\cos(\omega_0 t)+a_l\cos((\omega_0+\omega_1)t)+a_2\cos((\omega_0+\omega_2)t). \tag{A14}$$

Assuming H(ω)=1, the audio output for the two-tone case is $$audio_2=-2ca_1\omega_1^2\cos(\omega_1 t)-2ca_2\omega_2^2\cos(\omega_2 t)+2a_1a_2(2\omega_1\omega_2-\omega_1^2-\omega_2^2)\cos((\omega_1-\omega_2)t) \tag{A15}$$

Observations—

1. The audio signals are independent of the carrier frequency.
2. The audio signals' amplitudes are proportional to the carrier level, c.
3. The two-tone case for SSB modulation can have distortion (in the form of a difference tone).
4. The +12 dB per octave high frequency boost is present.

The distortion is present in the form of a difference frequency. The distortion amplitude is proportional to a $a_1a_2$, therefore, if one tone has a very small amplitude (relative to 1), the distortion will be very small. Also, if both tones have a small amplitude (low modulation index), then little distortion will result in the output.

The two-tone demodulated audio output that results from the real-world transducer case is $$\begin{aligned} audio_2 = &-2ca_1|H(\omega_0)||H(\omega_0+\omega_1)|\omega_1^2\cos(\omega_1 t+\theta_{01})- \\ &2ca_1|H(\omega_0)||H(\omega_0+\omega_2)|\omega_2^2\cos(\omega_2 t+\theta_{02})- \\ &2a_1a_2|H(\omega_0+\omega_1)||H(\omega_0+\omega_2)| \\ &(2\omega_1\omega_2-\omega_1^2-\omega_2^2)\cos((\omega_1-\omega_2)t+\omega_{01}-\omega_{02}) \end{aligned} \tag{A16}$$

Multiple Tone Case

Expressions were derived for the three tone case, and show that the demodulated audio output consists of the desired three tones plus distortion products consisting of three additional tone frequencies, in general. The frequencies of the distortion products are at the difference frequencies of each pair of desired tones. For example, if the desired frequencies are 1 kHz, 3 kHz and 8 kHz, than we will have distortion products at 2 kHz, 5 kHz, and 7 kHz.

For the multiple tone case, the demodulated audio output will consist of all the desired tones plus distortion products consisting of the difference frequency of every tone pair. Observe that the frequencies of the distortion products are always between 0 and the highest input frequency. That is, there are no frequencies generated that are greater than the highest input frequency. This suggests that the distortion could be mitigated without bandwidth expansion. This was the basis of the distortion compensator system previously developed and documented in co-pending U.S. patent application Ser. No. 09/384,084 filed by Croft et al. on Aug. 26, 1999. The methodology can be used with the present application in providing pre-distortion to the source signal to compensate for carrier modulation-induced distortion.

Next, we derive the relationship between electrical and acoustical modulation indices. The percentage of modulation at the output of the modulator is defined as the ratio of sideband amplitude to the carrier amplitude. For 1, 2 and 3 tones, the modulation indices are $$m_1 = \frac{a}{c} \text{ for a single tone,} \quad \text{(B1)}$$

$$m_2 = \frac{a_1 + a_2}{c} \text{ for 2 tones, and} \quad \text{(B2)}$$

$$m_3 = \frac{a_1 + a_2 + a_3}{c} \text{ for 3 tones} \quad \text{(B3)}$$

where the a's are the amplitudes of the sideband tones and c is the amplitude of the carrier.

The actual acoustical percentage of modulation for the transducer output can be written using the definition of the percent modulation and equations (A8), (A9), and (A10):

$$m_1 = \frac{a'}{c'} = \frac{a|H\omega_0 + \omega_1)|}{c|H(\omega_0)|} = m_1\frac{H(\omega_0 + \omega_1)}{|H(\omega_0)|} \text{ for a single tone,} \quad \text{(B4)}$$

$$m_2' = \frac{a_2' + a_2'}{c'} = \frac{a_1 H(\omega_0 + \omega_1)| + a_2|H(\omega_0 + \omega_2)|}{c|H(\omega_0)|} \text{ for two tones,} \quad \text{(B5)}$$

$$m_3' = \frac{a_2' + a_2' + a_3'}{c'} = \frac{a_1 H(\omega_0 + \omega_1)| + a_2|H(\omega_0 + \omega_2)| + a_3|H(\omega_0 + \omega_3)|}{c|H(\omega_0)|} \text{ for 3 tones} \quad \text{(B6)}$$

where H(ω) is the transfer function of the amplifier/transducer. The result shows that the actual percentage of modulation is highly dependent on the transfer function. For example, if the response of the transducer is low at the carrier frequency, an input with a 50% modulation could, conceivably, result in a 200% modulation at the transducer output. When modulating a single tone, over-modulation is not a problem because a single tone exhibits no distortion. However, when modulating multiple tones or audio source material such as voice or music, over-modulation will result in severe distortion. There are two basic approaches to avoid over-modulation.

Approach 1—Design the system so that H(ω) is flat. In this case, the electrical and acoustical percent modulations are equivalent. If there is no electrical over-modulation, then there will typically be no acoustic over-modulation. The audio signal may have to incorporate a bass-boost to compensate for the +12 dB per octave high-boost of the second derivative in Berktay's equation, (A1).

Approach 2—Design the system so that $|H(\omega_0+\omega_1)|$ is proportional to $1/\omega_1^2$. That is, the transducer (with equalizer, etc.) approximates the inverse of the second derivative effect. In this case, no audio equalization is required prior to modulation. For a constant carrier level, the amplitude of the tone, a, will be constant with frequency. Since, the percent modulation of the electronic output is proportional to a, the percent modulation of the acoustical output will be proportional to $a/\omega_1^2$. This second approach is approximated in implementation in one embodiment by configuring a matching network and transducer combination to compensate for the second derivative affect.

Independent of the approach taken above, a constant amplitude tone will yield an acoustical percentage modulation that decreases with frequency. For complex signals, higher frequency components result in a lower percentage of modulation and, therefore, less distortion. Another way to look at this is that parametric arrays produce higher frequencies more efficiently (because of the second derivative) and, therefore, require less modulation at the high frequencies.

Turning now to a conventional parametric array application, the desired signal is amplitude modulated (AM) or single sideband (SSB) modulated on an ultrasonic carrier in the range of 25 KHz to 100 KHz, amplified, and then applied to an ultrasonic transducer or emitter. If the ultrasonic intensity is of sufficient amplitude, the air column will perform demodulation or down-conversion over some length (the length depends mostly on the carrier frequency) and will realize the parametric array.

As noted, it was shown by H. O. Berktay, in his paper *"Possible Exploitation of Non-linear Acoustics in Underwater Transmitting Applications", Sound Vibration,* 1965, pp.435–461, with some assumptions, that the demodulated audio signal, p(t), in the far-field is proportional to the second time derivative of the modulation envelope squared:

$$audio = p(t) = k\frac{\partial^2}{\partial t^2}[(env(t))^2] \quad (1)$$

Here, k is assumed to be a constant for present purposes. Again, this is "Berktay's far-field solution" for the parametric acoustic array. Berktay looked at the far-field because the ultrasonic signals are no longer present there (by definition). The near-field demodulation produces the same audio signals at a lower level, however, there is also ultrasound present which must be included in a general solution. Since the ultrasound isn't audible, it can be ignored for the parametric array application. With this assumption, Berktay's solution is valid in the near-field as well as the far-field. As noted above, Equation (1) (or (A1)) is used as the starting point for developing distortion products for the discrete tone case with single sideband modulation and the relationship between electrical and acoustical modulation indices.

A useful carrier level control approach should reduce the carrier level in response to a reduced input signal level and, vice-versa, increase it in response to an increased signal level. The controller should also keep the carrier level at or above the signal level to avoid over-modulation and the resulting distortion.

The first step in achieving these goals is determining how the audio output volume of the system is affected by carrier level. Assuming the sideband level remains constant, the audio output level of a parametric array is directly proportional to the carrier level. Doubling the carrier level results in doubling the audio output level.

As an example, a control scheme that adjusts the carrier level in direct proportion to the peak input signal level can be used. A model of this basic carrier level controller is illustrated in FIG. 1. The input signal is assumed to have a range of up to ±1, giving a peak detector output, d, a range of 0 to 1. The constant multiplier, m, sets the modulation percentage and has a value between 0 and 1. The multiplier in the figure demonstrates the fact that the system gain is proportional to the carrier level.

If the input signal level does not change with time, the controller's steady state behavior can be analyzed. The peak detector has the desired affect on carrier level: full input results in a full carrier level, reduced input results in reduced carrier, and no input results in no carrier. This controller provides a constant percentage modulation, m, that is independent of the input level. However, the system has the undesirable affect of increasing the signal's dynamic range. For example, if the input signal level is reduced, the detector output drops, which results in a lowered system gain, which ultimately results in an excessive drop in the output level. Specifically, if we assume m=1 and the input level is 0 dB (peak amplitude=1), then the detector output will be 1 and the audio output d will be 0 dB. If the input is allowed to drop to −6 dB (amplitude=½), the detector output will be ½ and the audio output will be −12 dB (amplitude=¼). Similarly, a −12 dB input results in a −24 dB output, and so on.

The undesirable result is that the system illustrated in FIG. 1 is performing a downward 1:2 dynamic range expansion. Ax-dB drop in the input results in a 2x-dB drop in the output. In order to mitigate the dynamic range expansion behavior of the carrier controller, the carrier controller is preceded with a 2:1 dynamic range compressor. The resulting cascade will achieve carrier level control without changing the total end-to-end system gain.

It will be appreciated that an approach that controls the carrier level in proportion to, or as a non-decreasing function of, the input level will expand the dynamic range of the signal through the multiplier shown in FIG. 1. Practical carrier level controllers generally fit in this category, due to the multiplicative effect of the carrier level on system gain.

Figure 2:
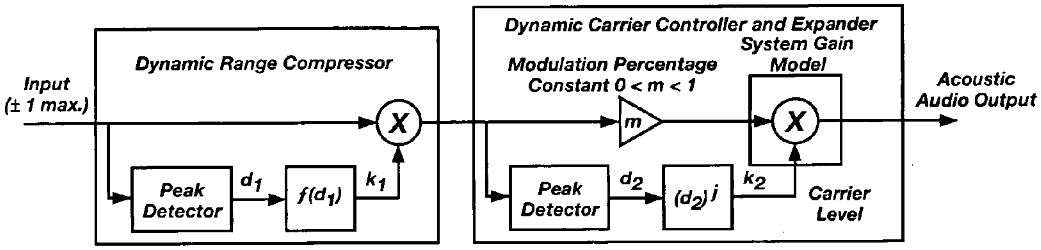
FIG. 2 is a schematic diagram illustrating a more generalized carrier level controller embodiment.

In accordance with the foregoing, the basic carrier controller's undesired expansion properties can be compensated for by adding a dynamic range compressor in front of the basic carrier controller of FIG. 1. With reference to FIG. 2, which illustrates such a system with a somewhat generalized carrier level controller, the system and operative principles will be further described. A power function $(d_2)^j$ has been added after the peak detector in the carrier control section. This function gives more flexibility in controlling the dynamic carrier. This power function can be further generalized to any non-decreasing function with a range and domain in [0,1].

By raising the second detector's output to the jth power, with 0≦j≦1, the carrier level can be varied from 1 (no dynamic carrier) to full dynamic carrier (constant percent modulation). The resulting dynamic range expansion ratio of the carrier controller portion is 1:(1+j) (e.g. dynamic range expansion of 1:2 for j=1, and 1:1 for j=0).

Next, the expression for the function $f(.)$ in FIG. 2 that preserves the input to output audio levels for a steady-state input level will be found, and then we can simplify the system so that it requires only one detector. To ensure that there is no net dynamic range expansion or compression, the end-to-end system gain is set to one (and let m=1), and with reference to FIG. 2 it becomes apparent that the following must hold:

$$k_1 k_2 = 1. \tag{2}$$

By utilizing the facts that $$k_1 = f(d_1) \tag{3}$$

and $$k_2 = (d_2)j \tag{4}$$

and with the observation that the second detector output is related to the first by $$d_2 = k_1 d_1 \tag{5}$$

then, the compressor's gain control function can be expressed as $$f(d_1) = d_1^{-(\frac{j}{1+j})}. \tag{6}$$

By combining (2), (3) and (6), both gains $k_1$ and $k_2$ can be expressed in terms of only the first detector's output:

$$\boxed{k_2 \quad \frac{1}{k_1} \quad d_1^{(\frac{j}{1+j})}} \tag{7}$$

Figure 3:
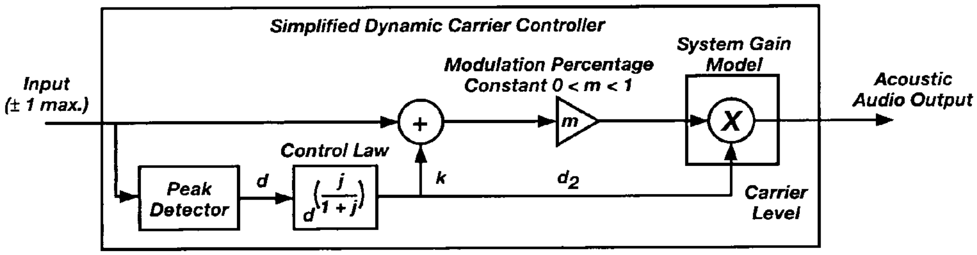
FIG. 3 is a schematic diagram showing another carrier level controller embodiment.

Using equation (7), we can simplify the dynamic carrier controller of FIG. 2, by omitting the second detector in FIG. 2. The resulting system is shown in FIG. 3. Full dynamic carrier control can be achieved with a constant percentage modulation by setting j=1, at which point the carrier level becomes the square root of the detector output: $k=\sqrt{d}$. At the other extreme, i.e., no dynamic carrier, setting j=0, then k=1, a constant carrier output of 1 results.

The exposition to this point has inherently made use of an assumption that the input level is and remains in a steady state. As will be appreciated, this is for purposes of illustration only, and in practical implementation of this embodiment in use with actual speech and music program material, there are signal dynamics present, which require abandoning this assumption. In practice, input signals with fast turn-on or attack transients must be manipulated. However, as mentioned above, the carrier level cannot be ramped up too quickly, or audible artifacts resulting from the change become noticeable to a listener to a problematic extent. It has been found that simultaneously resolving these two issues can be addressed through the use of a delay line in the signal path. A look-ahead delay allows the carrier to be raised slowly to the appropriate level before the signal transient arrives at the modulator. If the signal were to arrive before the carrier is ramped up sufficiently so that the envelope accommodates the peak, then undesirable overmodulation and distortion can occur.

It will be appreciated that changing the carrier amplitude in accordance with the forgoing is the equivalent of AM modulation of the carrier. AM modulation can be audible to a listener of the audio output of the parametric array system if the modulating frequency is too high. It has been found to be noticeable at frequencies above approximately 200 Hz. Therefore, a straightforward mitigation strategy is to provide a low-pass filter with a sufficiently long time constant in the carrier level control path. It has been found that an acceptable strategy is to ramp up the carrier at a maximum rate corresponding to a rise equaling 70% of the target value (peak) over a time period of 1 millisecond. As will be appreciated, the rise slope (derivative) of the amplitude time function is not limited to a fixed value, but rather to a certain percentage of the next peak. This methodology can be used on the other side of the peak, limiting the drop slope to 70% of the target value, which in this case can be a low point in a next trough of a source signal level vs. time function plot.

It has been found that this methodology works well enough in practice. The scheme mitigates over-modulation due to the carrier envelope not being made large enough, fast enough, to catch the peaks, which potentially could occur if a limiting value for the rise rate were simply fixed. At the same time, the audible artifacts of carrier modulation are reduced sufficiently so as to be essentially unnoticeable to a typical listener. Nevertheless, as noted above, in certain applications, particularly those with wideband low frequency response, a much longer delay may be desirable. The rate of change of increase or decrease of the envelope can be likewise limited, but can be limited to a lower value, as there is more time to look ahead for the peaks and valleys and tailor the envelope to the signal level without introducing noticeable distortion of the audio signal reproduced in the array. For example, an audio level envelope detector, as described herein, combined with an appropriate algorithm can tailor the carrier to the envelope of the audio signal with a good fit, given sufficient delay time for processing.

Turning the reader's attention again to the incoming signal detector, in detecting the level of the source signal in the look-ahead methodology in accordance with principles of the invention, conventional level detection schemes may often be inadequate and therefore problematic. The detector must respond to the peaks of the input signal. Use of an averaging or RMS-responding type detector could cause, or, more properly, allow, over-modulation because such a detector will not catch the signal peaks. On the other hand, a conventional peak detector uses a full wave rectifier to charge a capacitor with a specified attack time. Once the attack time is reached, the signal waveform is reduced to zero and the capacitor is discharged within a specified release time. This type of detector ideally should have a fast attack time to catch the signal peaks and slow release time to avoid the output ripple that would occur with low input frequencies. Often the release time will have to be excessive to avoid ripple, calling for long look-ahead delays. Additionally, the asymmetrical attack and release times implicit in a conventional peak detector are undesirable for carrier control. Hence, a conventional peak detector is also not best suited for the dynamic carrier source signal level detection application.

It has been recognized that in this embodiment an instantaneous envelope detector could be used to eliminate many of the shortcomings of the conventional peak detector. A known technique for extracting the envelope of a band-pass signal is to use a Hilbert transform filter to derive the in-phase (I) and quadrature (Q, 90-degree phase-shifted) parts of the signal, and calculate the envelope as the square root of the sum of the squares of I and Q. It will be recognized that the instantaneous envelope detector as contemplated requires a Hilbert transform filter. The parametric array system in total as also contemplated however, already employs a Hilbert transform filter in its SSB modulator. Furthermore, the Hilbert filter is in the correct position in the signal path for use with the dynamic carrier controller, as will be appreciated with reference to FIG. 4 and the discussion set out below in connection with that figure.

Figure 3A:
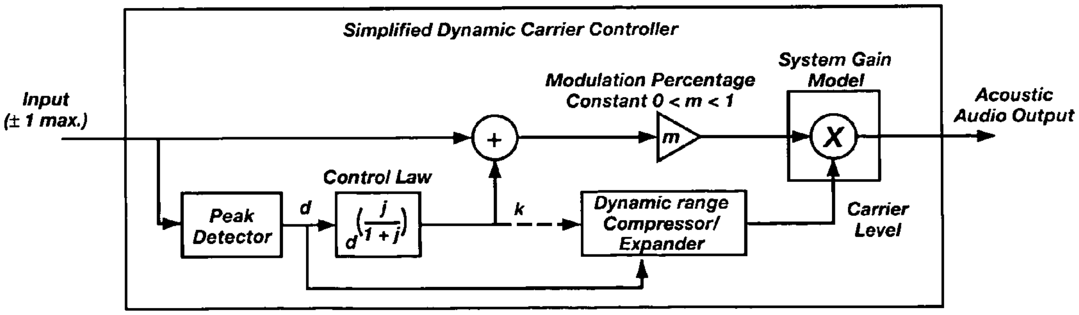
FIG. 3*a* is a schematic diagram showing a variation of the controller of FIG. 3, and which illustrates a way to include a dynamic range compressor, and an alternate way of implementation (doted line).

Turning to FIG. 3*a*, in another embodiment the system can include a dynamic range compressor (or compressor and/or expander). This is implemented by the addition of the dynamic range compressor (expander) which adjusts the level of the output based on the output from the peak detector by applying a control law (one of the many well know compression/expansion schemes) to the carrier level signal. This signal is fed into the multiplier (system gain model), and in this way the functions of carrier level control and dynamic range compression (expansion) are simultaneously realized. Of course in another embodiment the dynamic range compression(expansion) can be independently carried out as an earlier process step, but hardware cost savings, e.g. another detector and multiplier, can be realized by the implementation shown in the figure. As an alternative, the output from the carrier envelope processor (the first control law box in the signal path) can be the input for the dynamic range compressor/expander, with appropriate modification of the control law function to achieve essentially the same result.

Figure 4:
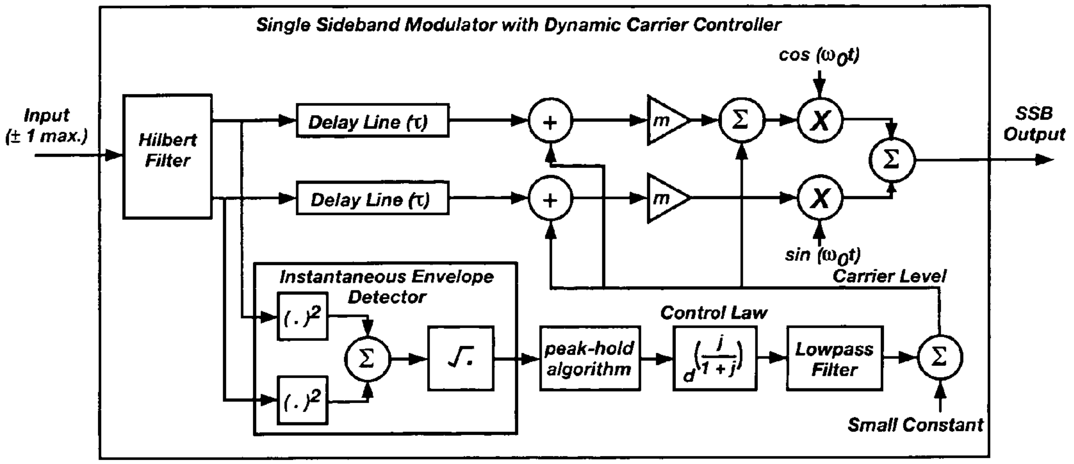
FIG. 4 is a schematic diagram illustrating an embodiment in a single-sideband modulator with a dynamic carrier controller.

FIG. 4 illustrates a practical implementation of a SSB modulator with a dynamic carrier controller that taps the existing Hilbert filter output for envelope detection. The in-phase and quadrature outputs of the Hilbert filter are each squared, then summed and the square root of that sum computes the envelope of the input. A peak-hold algorithm, shown as a block in the carrier modulation portion of the system, is provided to avoid over-modulation when the input signal abruptly reduces to zero. If no peak hold block were present, the following situation could arise: (1) the input signal abruptly drops to zero, and after the Hilbert filter's delay, the I and Q signals also drop to zero, (2) the detector output drops, (3) the low-pass filter output that was holding the previous peak value begins to decay, (4) the carrier level is reduced, (5) the full-level signals that continue to propagate through the delay lines are presented to the modulator input, and finally, (6) over-modulation results since the signal level is higher than the carrier level (assuming m=1). To address this over-modulation scenario, the peak-hold block algorithm holds the detector output for the delay time, $\tau$, if the detector output is dropping. If the detector output, instead, increases, the value gets passed immediately to the hold block and the delay timer is reset so it can hold during the next level drop for the full delay time, $\tau$. After the peak-hold algorithm is performed in FIG. 4, a control law (as described more fully below) is computed and a low-pass smoothing filter is applied. A small constant is added to the computed carrier level to avoid division by zero if no signal is present. An exemplary C-code segment of the dynamic carrier controller is listed in and shown on the following table:

TABLE 1

C-code segment for a Dynamic Carrier Controller using the Hilbert Filter.

```
// Calculate instantaneous envelope from Hilbert transform:
    envelope = sqrt(xI*xI + xQ*xQ);
// Dynamic range compressor for dynamic carrier
    // Peak hold envelope for delay time:
    if(envelope_held<=envelope){
        envelope_held = envelope;        // instant attack
        envelope_hold_count = 0;         // reset hold counter
    }
    else if(envelope_hold_count++> DELAY_DYNCARR){// if envelope<envelope_held and done holding
        envelope_held = envelope;        // instant release (after delay)
    }
// Set dynamic carrier level using control law: (envelope_held)^(j/(1+j)
    ftemp = pow(envelope_held, dynamic_carrier_power);
// Perform RC Filter:
    detector_state_DYNCARR = detector_DYNCARR_a1*detector_state_DYNCARR +
detector_DYNCARR_b1*ftemp;
// Add small constant to avoid division by 0 when no signal present:
    carrier_level = detector_state_DYNCARR + 1e-4;// minimum carrier:-80dB
// Scale delayed signals with inverse of carrier_level:
    xI = xI_delayed/carrier_level;
    xQ = xQ_delayed/carrier_level;
// Set maximum modulation level:
    xI = max_modulation*xI,
    xQ = max_modulation*xQ;
// Add DC term for carrier injection.
    xIp = xI + carrier_level;
// Next use xIp and xQ     as input to single sideband modulator . . . (not shown)
```

Note that it is assumed that the Hilbert Filter output values xI and xQ have previously been computed. This code is executed once per input sample.

Figure 5:
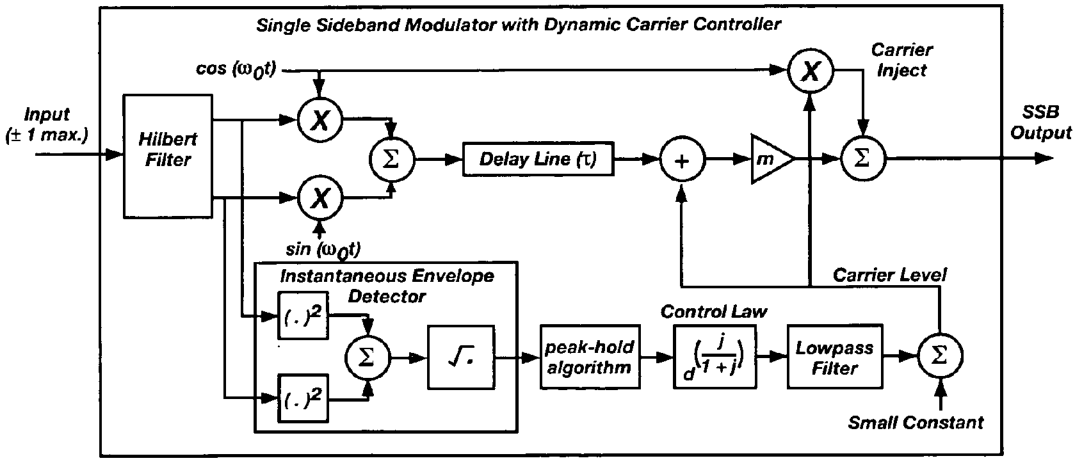
FIG. 5 is a schematic diagram showing a further embodiment in another single-sideband modulator with a dynamic carrier controller using a single delay line.

With reference to FIG. 5, another exemplary embodiment of the SSB modulator and carrier control system in accordance with the invention and the foregoing is illustrated This implementation uses only one delay line and injects the carrier signal after a suppressed carrier modulator. Otherwise, it is similar to that shown in FIG. 4.

In comparing the realizations of the inventive concept in the two embodiments, we can write the SSB output of FIG. 4 by inspection, and simplify it as follows $$\begin{aligned} SSB\ Output_{Figure\ 4} &= \left(\frac{I(t-\tau)}{c}m + c\right)\cos(\omega_0 t) - \left(\frac{Q(t-\tau)}{c}m\right)\sin(\omega_0 t) \\ &= c\cos(\omega_0 t) + \frac{m}{c}[I(t-\tau)\cos(\omega_0 t) - Q(t-\tau)\sin\omega_0 t)] \end{aligned} \tag{8}$$

where I(t) and Q(t) are the end-phase and quadrature signals from the Hilbert Filter. Similarly, the SSB output of FIG. 5 can be written by inspection as $$\begin{aligned} SSB\ Output_{Figure\ 5} &= c\cos(\omega_0 t) + \frac{m}{c}[I(t-\tau)\cos(\omega_0(t-\tau)) - Q(t-\tau)\sin\omega_0(t-\tau))] \\ &= c\cos(\omega_0 t) + \frac{m}{c}[I(t-\tau)\cos(\omega_0 t - \omega_0\tau - Q(t-\tau)\sin\omega_0 t - \omega_0\tau)] \end{aligned} \tag{9}$$

From the two expressions, we can see that the only difference in the two outputs is the trivial phase-shift constant of $-\omega_0\tau$ in the modulator of the second realization (FIG. 5). This phase-shift has substantially no effect on the performance of the modulator.

Figure 6:
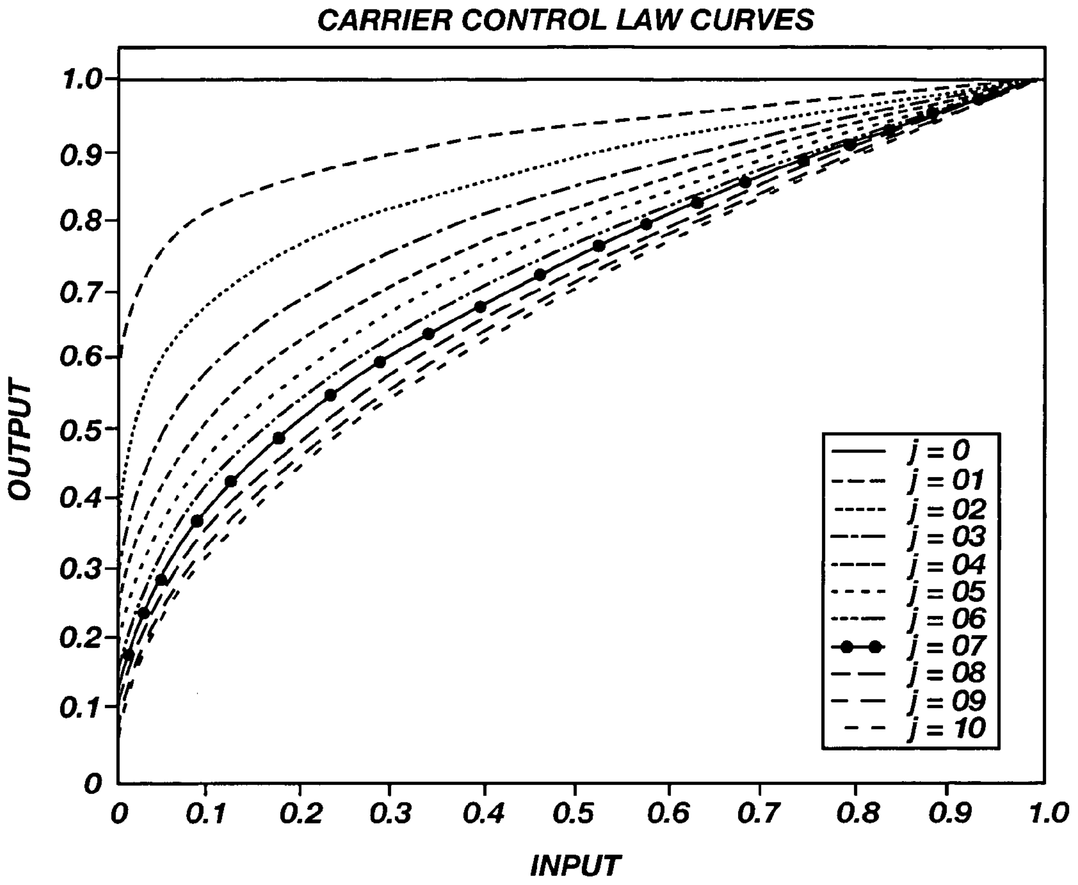
FIG. 6 is a plot of input vs. output which shows a family of carrier control law curves in one embodiment of the invention.

As mentioned, in implementing the system in the embodiments of the invention described above a control law is also used to assure that the SSB modulator will not over-modulate. FIG. 6 shows plots of calculated control law functions for a number of j values. An arbitrary non-decreasing function that is greater than or equal to $\sqrt{x}$ and less than one on $x\in[0,1]$ can be used as the control law. This arbitrary non-decreasing function will reduce the carrier level when the input level is reduced and thus it will prevent over-modulation by the SSB modulator. However, it should be understood that while the electronic modulator is limited to 100% modulation (for $m\leqq 1$), that does not mean that the resulting acoustic output is limited to 100% modulation. For example, if the amplifier/emitter combination has a higher gain for the sideband signal than for the carrier, then the actual signal emitted to the air will have an increased modulation ratio.

It is important to recognize the significance of the actual maximum percentage of acoustic modulation (m') of the emitter output, because it is this value that ultimately determines the amount of distortion produced at a listener's location. For a single tone input, with the assumption of equalizer design approach #2 set forth above, the maximum acoustic modulation, m' is proportional to the SSB modulator's maximum modulation, m and is inversely proportional to the input frequency squared:

$$m' \propto m\frac{1}{\omega^2} \tag{10}$$

This relationship holds with the following assumption: an amplifier/emitter magnitude response perfectly equalizes the second derivative effect in Berktay's equation, resulting in a flat response at the listener location. It has been found that this assumption approximately holds in the current empirical evaluations of relevant parametric sound reproduction systems because the roll-off characteristics of the emitters and the use of lower sideband modulation nearly equalizes the response. Equation (10) holds with or without the dynamic carrier controller described above enabled. If the dynamic carrier controller is set for constant modulation, then m (the electronic percent modulation) is simply a constant in equation (10), and the acoustical percent modulation is inversely proportional to the input frequency squared.

The implications of this "frequency-dependent modulation index" are that higher frequencies give a reduced percentage of modulation, and lower frequencies have increased modulation. Severe over-modulation could occur at low frequencies, even if the SSB modulator is at less than 100%. To avoid low frequency over-modulation and the resulting distortion, the lowest audio frequencies must be limited with a high-pass filter or appropriately modify the transducer response, so that the assumption above does not hold at low frequencies, or both.

As mentioned above, in another embodiment the audible artifacts of carrier distortion can be mitigated by pre-distorting the source signal and/or the carrier to compensate for the distortion. As mentioned, in co-pending U.S. patent application Ser. No. 09/384,084 filed by Croft et al. on Aug. 26, 1999, and assigned to the same assignee as the present application, which is hereby incorporated herein by reference for the relevant teachings consistent with this disclosure, an approach for pre-distorting the audio signal to compensate for anticipated distortion is disclosed. The distortion compensator system described in the referenced co-pending application predicts the distortion products based on the parametric array model and the carrier level. The distortion compensator then pre-distorts the signal prior to the modulator.

In the above-referenced application, it is assumed that the carrier level is set to a constant value of 1. The distortion compensator described therein can be modified to work with variable carrier levels. Rather than setting the carrier level to 1, as in the SSB Channel Model, the carrier level will be made to vary directly with the carrier control value generated. This carrier control value can vary from 0 to 1.

Given the input of the actual carrier level, the distortion compensator can compute the correct pre-distortion to apply and modify the signal to achieve the desired distortion compensation. There is one caveat to the direct application of this approach: the carrier control signal must be made to change slowly relative to the time delay through the distortion compensator stages described in that reference. For a typical delay of one millisecond per stage (of the distortion compensator), the overall delay would add up quickly in a high-order compensator. The result is that a fast responding dynamic carrier detector could lead to race conditions in the distortion compensator.

However, by using sufficient look-ahead delay in the dynamic carrier system this caveat can be addressed. By using a look-ahead delay, and by using delay compensation of the carrier control variable as it is fed back to the distortion compensator stages, the above-mentioned potential problem is itself mitigated.

As will be appreciated, while the immediately forgoing addresses applying a pre-distortion to the source signal before modulation, the correction can be calculated in a similar way, but applied instead to the carrier. As mentioned, a pre-distortion could be applied to both source and carrier signals. For example, the latter scheme may be used when distortions due to differing causes are separately accounted for, calculated, and applied.

As will be appreciated, a system in accordance with the invention can reduce the net power requirements of the system without noticeably degrading audio output from a parametric array. The efficiencies realized can reduce costs and extend the life of emitters used in the system. Further, the invention enables a system where a average carrier level and output energy are significantly lower. These advantages are realized without noticeably sacrificing audio output quality from the perspective of a typical listener.

As mentioned, it is to be understood that the above-described arrangements are only illustrative of the application of the principles of the present invention. Numerous modifications and alternative arrangements may be devised by those skilled in the art without departing from the spirit and scope of the present invention. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made without departing from the principles and concepts set forth herein.

The invention claimed is:

1. A method for improving performance of a parametric speaker system, comprising the steps of:

a) delaying an audio signal prior to parametrically reproducing the audio signal;

b) monitoring a level of the audio signal during the delay; and c) modulating a carrier envelope based on the monitored level of the audio signal to provide sufficient power to produce a desired audio output and reduce carrier energy when it is not required to reproduce the signal, combining the delayed audio signal with the modulated carrier to parametrically reproduce the audio signal, thereby improving power use efficiency.

2. A method in accordance with claim 1, comprising the further step of pre-processing the audio signal to minimize distortion of the parametrically reproduced audio signal.

3. A method in accordance with claim 1, comprising the further steps of:

a) reducing sound artifacts induced by carrier modulation so as to be substantially unnoticeable to a listener by;

i) limiting a growth rate of the carrier envelope based on a first target value of the audio signal; and ii) limiting a rate of decay of the carrier envelope based on a second target value of the audio signal.

4. A method in accordance with claim 3, comprising the further steps of:

a) providing a delay of about one millisecond; and b) limiting the growth rate of the carrier envelope to about 70% of the first target value over the time period of the delay.

5. A method in accordance with claim 3, wherein the first target value is a peak amplitude value of the audio signal and the second target value is a minimum amplitude value of the audio signal.

6. A method in accordance with claim 1, where in the delay is up to 3 milliseconds.

7. A method in accordance with claim 1, comprising the further step of limiting the growth rate and rate of decay of the carrier envelope by limiting a change in slope of the carrier envelope as a function of time.

8. A method in accordance with claim 1, comprising the further step of analyzing the delayed audio signal and modifying the carrier envelope to comprise a smoothed envelope which encompasses the audio signal.

9. A method in accordance with claim 8, comprising the further step of modulating the smoothed carrier signal envelope so that the rate of increase and the rate of decay of the carrier envelope are both controlled to be within a preset limit.

10. A method in accordance with claim 9, comprising the further step of imposing the audio signal on the smoothed modulated carrier envelope to produce a sideband signal, thereby minimizing distortion of the sideband signal due to carrier envelope modulation.

11. A method in accordance with claim 1, comprising the further step of pre-distorting the audio signal to substantially compensate for undesirable distortion introduced by modulation of the ultrasonic envelope.

12. A method in accordance with claim 1, comprising the further step of pre-distorting the carrier envelope to compensate for distortion induced by modulation of the carrier envelope.

13. A method in accordance with claim 1, comprising the further step of sampling the level of the audio signal during the time delay and calculating an optimal modification to the modulation of the carrier envelope based on the audio signal to reduce undesirable audio artifacts of carrier envelope modulation.

14. A method in accordance with claim 1, further comprising the step of compressing the dynamic range.

15. A method for improving performance of a parametric speaker system, comprising the steps of:

a) delaying an audio signal prior to parametrically reproducing the audio signal;

b) monitoring a level of the audio signal during the delay; and c) modulating a carrier envelope to be associated with the audio signal so as to limit growth and decay ahead of and behind rapid changes in the audio signal level to smooth the carrier envelope to reduce audio artifacts resulting from corner modulations, whereby power use efficiency of parametric reproduction is increased and noticeable distortion of the audio signal is reduced.

16. A method in accordance with claim 15, further comprising the step of compressing the dynamic range.

17. A system for optimizing carrier signal strength for dynamic audio signal reproduction in a parametric audio reproduction system, comprising:

a) a time delay processor for delaying an audio signal to enable sensing and processing of the audio signal prior to parametrically reproducing the audio signal;

b) a signal envelope sensor configured to sense an envelope corresponding to a parameter of the audio signal; and c) a carrier wave generator configured to generate a modulated carrier wave based on the envelope sensed by the signal envelope sensor;

d) wherein the audio signal is delayed, the signal envelope is sensed, and the carrier wave is generated and modulated to improve power use efficiency in parametric reproduction of the audio signal.

18. A system in accordance with claim 17, further comprising a pre-processor configured to pre-process the audio signal to create minimal detectable distortion of the audio signal.

19. A system in accordance with claim 17, wherein the carrier wave generator modulates the carrier wave by increasing or decreasing a growth or decay rate of the carrier wave based on a target value of the audio signal.

20. A system in accordance with claim 17, further comprising a pre-processor configured to pre-process the audio signal to create minimal detectable distortion of the audio signal.

21. A system in accordance with claim 17, wherein the time delay processor delays the audio signal by up to 3 milliseconds.

22. A system in accordance with claim 17, wherein the carrier wave generator modulates the carrier wave such that a rate of increase and a rate of decay of the carrier wave are both controlled to be within a preset limit.

23. A system in accordance with claim 17, further comprising an audio signal processor which pre-distorts the audio signal to substantially compensate for undesirable distortion induced by modulation of the carrier wave.

24. A system in accordance with claim 17, further comprising a carrier wave processor which pre-distorts the carrier wave to substantially compensate for undesirable distortion induced by modulation of the carrier wave.

25. A system in accordance with claim 17, further comprising a dynamic range compressor.

26. A system in accordance with claim 25, further comprising a dynamic range expander.

* * * * *